Nov. 10, 1931.  F. A. GARVEY  1,831,593
FEEDING DEVICE FOR ANIMALS
Filed Feb. 14, 1930
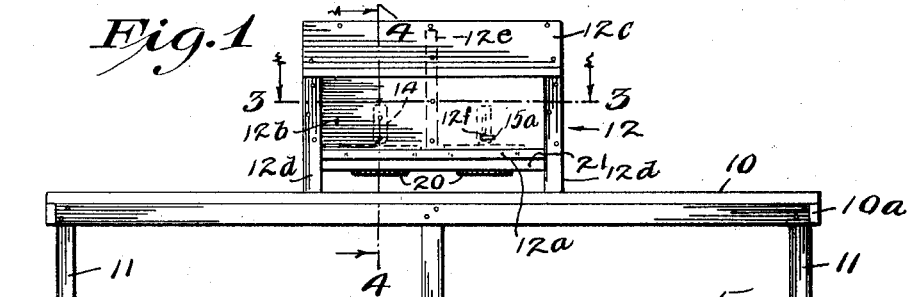
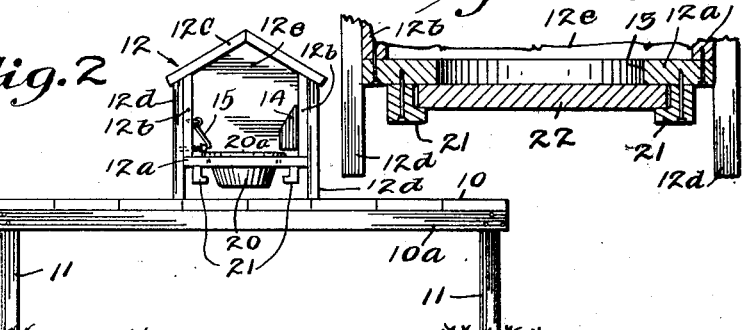
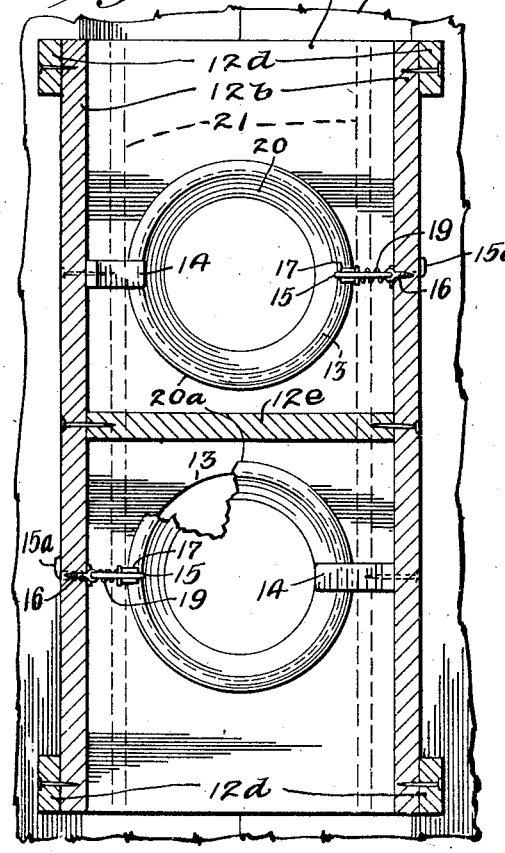
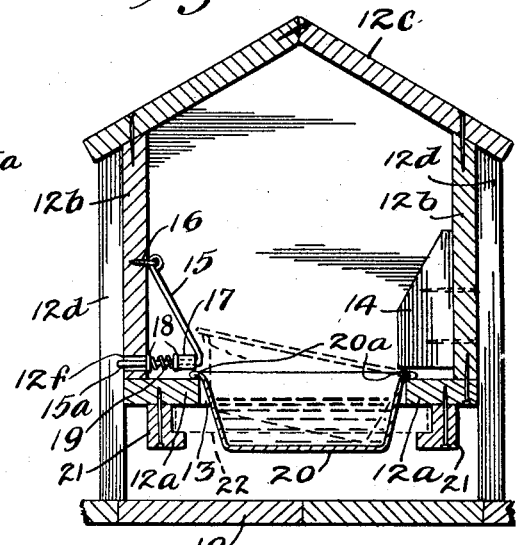
Inventor
Frank A. Garvey
By his Attorneys Patented Nov. 10, 1931

1,831,593

UNITED STATES PATENT OFFICE

FRANK A. GARVEY, OF LYNXVILLE, WISCONSIN

FEEDING DEVICE FOR ANIMALS

Application filed February 14, 1930. Serial No. 428,332.

This invention relates to a feeding apparatus for animals and while the same is efficient for feeding various kinds of animals, it particularly has been designed for use as a fox feeder on fox ranches. It is desirable in feeding foxes or other animals to have the food so disposed that it will not be unduly scattered. It is also desirable to have the food so held or disposed in a container that it will be away from the ground and thus not apt to be mixed with dirt. It is a further desideratum to have the food contained in some vessel which vessel is covered or disposed in a covered housing so that the food will be protected from the weather. It is also desirable to have the food so disposed that the animal must approach it from a certain direction and to have it at a certain height from the support on which the animal stands. The receptacle containing the food should also be capable of being easily removed and placed in feeding position.

It is an object of this invention, therefore, to provide a simple and efficient apparatus for feeding foxes or other animals which comprises a covered feeding receptacle effectively held in position.

It is another object of the invention to provide a feeder for foxes or other animals comprising a covered housing having means therein for holding and retaining an easily removable receptacle adapted to contain the food.

It is a further object of the invention to provide a feeding apparatus comprising a housing having a floor, side walls and cover, with open ends, together with a partition between said ends, the housing being constructed and arranged to hold a food containing receptacle adjacent either open end thereof.

It is more specifically an object of the invention to provide an apparatus for feeding foxes or other animals comprising a covered housing having an elevated floor, said floor having an opening therein adapted to receive a food-containing receptacle, means being disposed at one side of the receptacle preventing an upward movement thereof and a laterally movable latch being disposed at the opposite side of the receptacle adapted to be moved by the receptacle as it is placed in position and to move the same so that the receptacle is held from vertical movement.

These and other objects and advantages of the invention will be fully set forth in the following description made in connection with the accompanying drawings, in which like reference characters refer to similar parts throughout the several views, and in which:—

Fig. 1 is a view in side elevation of the device showing the same disposed on an elevated platform;

Fig. 2 is a view in front elevation of the structure shown in Fig. 1;

Fig. 3 is a view in horizontal section taken on line 3—3 of Fig. 1;

Fig. 4 is a view in vertical section taken on line 4—4 of Fig. 1, and

Fig. 5 is a partial view similar to Fig. 4 showing a modified form of the invention.

Referring to the drawings, in Figs. 1 and 2 is shown an elevated platform 10 mounted upon a plurality of vertically extending posts or legs 11, said legs being shown as six in number and spaced along the sides of said platform. Platform 10 is also shown as having a depending flange or side portion 10a at its outer edge.

Disposed upon the platform 10 is a feeding device comprising housing 12. Housing 12 comprises a floor 12a, side walls 12b, and a roof 12c, which roof is illustrated as a gable roof having its lower sides extending some distance beyond the side walls 10b. The roof 12c and floor 12a are shown as being nailed to the side walls 12b and the latter secured by any suitable means, such as the nails shown, to vertical leg members 12d disposed at the four corners of the housing at the outer sides of the side walls 12b. Said legs 12d extend some distance beneath the floor 12a so that the latter is elevated some distance above the platform 10. Said housing also has a partition 12e extending between side walls 12b midway between the ends of the housing, which partition extends from the floor to the roof. The ends of the housing as shown are open. Floor 12a has formed therein at each side of partition 12e an aperture 13. Blocks 14 are secured to one of the side walls 12b by any suitable means such as the nails shown, said blocks being illustrated as rectangular in horizontal cross section and having their upper portions beveled so as to have surfaces sloping toward the side walls. The bottom of each block 14 is spaced from the floor 12a so as to form a narrow slot between said bottom and the floor. The blocks 14 are disposed with their central vertical planes extending transversely through the centers of the openings 13. At the opposite side of said opening and substantially in the said plane is disposed a spring latch comprising a rod 15. Said rod has an eyelet at its upper end disposed in a screw eye 16 secured in the side wall 12b, said rod extending downwardly and inwardly from the said eyelet. Said rod has a horizontal portion 15a disposed a short distance above the floor 12a which portion projects through a hole 12f in said side wall. A small block or sleeve 17 is disposed on the portion 12a at its inner end and spaced washers 18 are also disposed on said horizontal portion between which washers is disposed a compression coiled spring 19. Said spring engages one of the washers at each end, one of said washers engaging sleeve 17 and the other engaging the inner side of wall 12b and extending over hole 12f. Member 15 with the parts carried thereby thus forms a spring latch capable of being pressed outwardly toward the side wall and movable inwardly by the tension of spring 19. A receptacle 20 is shown and while this receptacle might take various forms, in the embodiment of the invention illustrated it is shown as having upwardly flaring sides provided with a peripheral rim 20a. Floor 12a has secured thereto by a suitable means, such as the nails shown, rabbeted strips 21 extending longitudinally of said floor and disposed at each side of the holes 13. Said strips 21 have their rabbeted portions facing each other and thus forming a guideway. This guideway is adapted at certain times to receive a plate or board 22 as shown in Fig. 5, which thus extends directly beneath and closes the holes 13.

In operation the food will be placed in the receptacles 20 and the operator will then place the receptacle in the opening 13. The receptacle will be tilted as indicated in dotted lines in Fig. 4 and the rim 20a at one side inserted in the slot between block 14 and floor 12a. The other side of the receptacle will then be pushed downwardly against member 15. Member 15 will be moved outwardly compressing spring 18 until the rim 20a passes beneath the same and sleeve 17 at which time the spring 19 will force member 15 inwardly moving the same over said rim. Receptacle 20 is now firmly held in the hole 13 and prevented from upward movement by both block 14 and the latch formed by member 15 and associated parts. The animals can now eat the food in the receptacles 20 by standing at the ends of the housing with their heads projecting thereinto. It will be seen that the receptacle 20 and food therein will be sheltered from the rain or snow by the roof 12c. When it is desired to remove the pan 20, the operator merely moves back the member 15 by pressing the same with his hand and the pan can then be again tilted and removed. It is thus seen that the pan or receptacle 20 can be easily and quickly placed in position or removed.

With some kinds of food it is not necessary to use the receptacle 20 and the board or plate 22 is then placed in position in the slides 21, as shown in Fig. 5, and the food would then be placed in the holes 13 on the board or plate 22.

From the above description it is seen that applicant has provided a very simple and efficient apparatus for feeding foxes or other animals. The same can be easily and inexpensively constructed and at the same time made quite rugged. The food is well protected and can be easily placed in the feeder. The animals have easy access to the food and at the same time the food is not spilled or distributed about on the ground. The device has been amply demonstrated in actual practice and found to be very successful and efficient.

It will, of course, be understood that various changes may be made in the form, details, proportions and arrangement of the parts, without departing from the scope of applicant's invention, which, generally stated, consists in a device capable of carrying out the objects above set forth, in the novel parts and combinations of parts disclosed and defined in the appended claims.

What is claimed is:—

1. A feeding device comprising a housing having a floor, sides and top, said floor having an aperture therein, a receptacle adapted to substantially fit in said aperture and having a rim thereon, means mounted adjacent one side of said aperture spaced from said floor to form a slot which receives said rim and a resilient catch mounted on the opposite side of said aperture adapted to be operated to move away from said receptacle and snap over said rim whereby said receptacle can be lifted from said aperture.

2. A feeding device comprising a housing having an elevated floor, side walls, a roof and a partition substantially in the center thereof extending substantially from said floor to said roof, said housing having open ends, said floor having a hole therein at each side of said partition, receptacles adapted to fit in said holes respectively, means at the opposite sides of each hole to hold said receptacles in place, one of said means being movable to permit insertion and removal of said receptacle.

3. A feeding device comprising a housing having an elevated floor, side walls and a roof, said housing being open at one end, said floor having an aperture therein, a receptacle adapted to substantially fit in said aperture and having a laterally extending rim at its upper end, a block at one side of said aperture secured to one side wall and having its bottom spaced from the floor to form a slot adapted to receive said rim and a laterally movable spring-actuated catch at the opposite side of said hole adapted to be moved laterally by movement of said receptacle to permit insertion of said receptacle in said hole and to move over the top of said receptacle whereby said receptacle is kept from vertical movement.

4. A feeding device comprising a housing having a floor, side walls and top, said floor having an aperture therein adapted to receive a receptacle, a catch for holding said receptacle in place comprising a member having an eyelet secured above said floor to one of said side walls and extending downwardly and inwardly, said member having a horizontal portion at its lower end extending laterally, said side wall having an aperture through which said horizontal portion projects, a compression spring mounted on said horizontal portion whereby said member may be pressed toward said side wall against the tension of said spring and will be moved outwardly by said spring so as to be disposed over a receptacle disposed in the aperture in said floor.

In testimony whereof I affix my signature.

FRANK A. GARVEY.